United States Patent
Wright et al.

(10) Patent No.: US 6,919,576 B2
(45) Date of Patent: Jul. 19, 2005

(54) COMPOSITE NEUTRON ABSORBING COATINGS FOR NUCLEAR CRITICALITY CONTROL

(75) Inventors: Richard N. Wright, Idaho Falls, ID (US); W. David Swank, Idaho Falls, ID (US); Ronald E. Mizia, Idaho Falls, ID (US)

(73) Assignee: Bechtel Bwxt Idaho LLC, Idaho Falls, ID (US)

( * ) Notice: Subject to any disclaimer, the term of this patent is extended or adjusted under 35 U.S.C. 154(b) by 427 days.

(21) Appl. No.: 10/067,708

(22) Filed: Feb. 4, 2002

(65) Prior Publication Data

US 2003/0147485 A1 Aug. 7, 2003

(51) Int. Cl.[7] .............................................. G21C 11/00
(52) U.S. Cl. .................................................. 250/518.1
(58) Field of Search ......................... 250/518.1, 506.1, 250/515.1; 164/46; 376/272; 148/525

(56) References Cited

U.S. PATENT DOCUMENTS

| | | | |
|---|---|---|---|
| 4,756,871 A | * | 7/1988 | Mallener .................... 376/272 |
| 4,780,268 A | * | 10/1988 | Papai et al. ............... 250/506.1 |
| 5,786,611 A | | 7/1998 | Quapp et al. |
| 5,980,604 A | * | 11/1999 | Lavernia ....................... 75/338 |
| 6,125,912 A | * | 10/2000 | Branagan et al. ............. 164/46 |
| 6,166,390 A | | 12/2000 | Quapp et al. |
| 6,258,185 B1 | * | 7/2001 | Branagan et al. ........... 148/525 |

* cited by examiner

Primary Examiner—John R. Lee
Assistant Examiner—Phillip A. Johnston
(74) Attorney, Agent, or Firm—Trask Britt PC

(57) ABSTRACT

Thermal neutron absorbing composite coating materials and methods of applying such coating materials to spent nuclear fuel storage systems are provided. A composite neutron absorbing coating applied to a substrate surface includes a neutron absorbing layer overlying at least a portion of the substrate surface, and a corrosion resistant top coat layer overlying at least a portion of the neutron absorbing layer. An optional bond coat layer can be formed on the substrate surface prior to forming the neutron absorbing layer. The neutron absorbing layer can include a neutron absorbing material, such as gadolinium oxide or gadolinium phosphate, dispersed in a metal alloy matrix. The coating layers may be formed by a plasma spray process or a high velocity oxygen fuel process.

22 Claims, 4 Drawing Sheets

COMPOSITE NEUTRON ABSORBING COATINGS FOR NUCLEAR CRITICALITY CONTROL

CONTRACTUAL ORIGIN OF THE INVENTION

The United States Government has rights in this invention pursuant to contract number DE-AC07-99ID13727 between the United States Department of Energy and Bechtel BWXT Idaho, LLC.

BACKGROUND OF THE INVENTION

1. Field of the Invention

The present invention relates generally to radiation shielding materials for nuclear criticality control. In particular, the invention relates to composite neutron absorbing materials and methods of coating these materials on storage containers for use in spent nuclear fuel applications requiring long term storage and corrosion resistance.

2. Background Technology

The reliance on nuclear power as a method for power generation has been increasing rapidly in recent years, due to a corresponding increase in the demand for electric power throughout the world. Accordingly, the amount of spent nuclear fuel (SNF) has increased along with the need for safe methods for long term storage and disposal of these radioactive waste materials. Ideal containers for storage and transport of radioactive wastes should have the capability of safe containment for as many years as possible. There are, however, significant safety issues involved in the safe, long-term storage of SNF elements due to high levels of uranium enrichment.

In response to these issues, various thermal neutron absorbing materials have been developed for placement in close proximity to SNF elements to capture the neutrons that are emitted from the fuel to prevent nuclear criticality accidents. In conventional storage approaches, arrays of neutron absorbing materials are placed or incorporated into storage containers holding SNF elements. The typical containment system includes a shielded container which has at least one internal shell that is coated with a material capable of preventing thermal neutrons emitted from the SNF from initiating an unwanted nuclear chain reaction. Stainless steel has been frequently used as a structural component of SNF storage containers because it has good corrosion resistance and acceptable mechanical properties.

Various other approaches have been developed for containment of spent nuclear fuel. For example, U.S. Pat. Nos. 5,786,611 and 6,166,390 to Quapp et al. disclose radiation shielding containers for storing radioactive materials. The containers are formed from a concrete product including a stable uranium aggregate and a neutron absorbing material. Possible neutron absorbing materials described are $B_2O_3$, $HfO_2$, and $Gd_2O_3$. The concrete product is formed by a liquid phase sintering process that allows the addition of the neutron absorbing additives at the same time as the formation of the uranium aggregate.

In U.S. Pat. No. 6,125,912 to Branagan et al., neutron absorbing materials are disclosed that utilize rare earth elements, such as gadolinium, europium, and samarium. These materials are formed as metallic glasses or nanocrystalline materials which can be incorporated into SNF storage containers. The method for making these materials comprises: starting with a base alloy composition which contains the rare earth element along with one or more transition metals, forming a melt of the base alloy, and then rapidly solidifying the base alloy melt using surface quenching or atomization techniques. The resulting neutron absorbing material is in the form of an amorphous glass or a material with partial crystallinity and partial amorphicity, or in the form of a powder.

Other typical neutron absorbing materials that have been used in SNF storage containers include the following: boron carbide in an aluminum matrix; boron carbide in an elastomeric matrix; boron carbide in a resin matrix; aluminum-boron alloys; borated stainless steel alloys; and stainless steel clad neutron absorbing materials. Many of these materials, however, have been shown to have the following disadvantages: aluminum-based materials have inferior corrosion resistance in some wet storage environments; the elastomeric and resin-based materials are susceptible to radiation damage which causes embrittlement, and the borated stainless steels have weldability and mechanical property (low ductility/fracture toughness) problems.

With respect to borated stainless steels, these have typically been used since boron has a large absorption cross section for thermal neutrons. However, borated stainless steels have a limited range of usefulness because of certain metallurgical properties, for example, an inability to be easily welded into the required structural shapes for the containers. In addition, boron is somewhat soluble in water, which can result in eventual deterioration of a container made from a borated stainless steel. Further, the bombardment of borated stainless steel by the neutrons emitted by radioactive material has the effect of reducing its effectiveness as a neutron absorber, making it an unsuitable material for long term safe containment of radioactive waste products.

Accordingly, it would be desirable and advantageous to provide improved aterials and methods for making containers more safe in the transport and storage of radioactive waste.

SUMMARY OF THE INVENTION

The invention relates to thermal neutron absorbing composite materials and methods of applying such materials to various objects used in spent nuclear fuel or other radioactive waste storage systems. The composite neutron absorbing materials can be easily coated onto surfaces of storage containers or other objects used in the storage and transportation of spent nuclear fuel or other radioactive waste, which require long term storage capability and corrosion resistance.

A composite neutron absorbing coating applied to a substrate surface according to the invention includes a neutron absorbing layer overlying at least a portion of the substrate surface, and a corrosion resistant top coat layer overlying at least a portion of the neutron absorbing layer. An optional bond coat layer can be formed on the substrate surface prior to forming the neutron absorbing layer. The neutron absorbing layer can include a neutron absorbing material, such as gadolinium oxide or gadolinium phosphate, dispersed in a metal alloy matrix such as a metal alloy comprising nickel, molybdenum, chromium, tungsten, and iron.

In another embodiment of the invention, a composite neutron absorbing coating applied to a substrate surface includes a graded coating layer overlying at least a portion of the substrate surface. The graded coating layer comprises a metal alloy matrix, and a plurality of neutron absorbing particles disposed in the metal alloy matrix such that there is a gradual decrease in the amount of neutron absorbing particles toward an outer surface of the graded coating layer opposite from the substrate surface.

In another aspect of the invention, a storage system is provided which includes one or more internal surfaces configured to be exposed to thermal neutrons from spent nuclear fuel or radioactive waste. A composite neutron absorbing coating is applied to the one or more internal surfaces, with the coating comprising a neutron absorbing layer overlying at least a portion of the one or more internal surfaces, and a corrosion resistant top coat layer overlying at least a portion of the neutron absorbing layer. The one or more internal surfaces can be on objects such as storage containers, canisters, tubes, blocks, squares, baskets, grid arrays, or other objects used in the storage of spent nuclear fuel or radioactive waste.

A method of forming a composite neutron absorbing coating on a substrate surface according to the invention includes forming a neutron absorbing layer over at least a portion of the substrate surface, and forming a corrosion resistant top coat layer over at least a portion of the neutron absorbing layer. The layers of the composite neutron absorbing coating can be formed by a thermal spray process, such as a plasma spray process or a high velocity oxygen fuel process.

These and other aspects and features of the present invention will become more fully apparent from the following description, or may be learned by the practice of the invention as set forth hereinafter.

BRIEF DESCRIPTION OF THE DRAWINGS

In order to illustrate the manner in which the above recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention is directed to thermal neutron absorbing coating materials, and methods of applying such coating materials to spent nuclear fuel (SNF) storage systems or other radioactive waste storage systems, such as storage containers and structures within the containers. The coating materials of the invention have sufficient neutron absorbing or neutron poison capability and long term corrosion resistance to provide for criticality control in spent nuclear fuel storage systems. The terms "neutron absorbing" or "neutron poison" refers to the ability of a material or element to interact with neutrons emitted from a radioactive material, such as by attenuating and/or absorbing such neutrons. A storage container coated with the neutron absorbing materials of the invention is suitable for use in the safe transport, storage and disposal of radioactive wastes, and is expected to retain neutron absorbing and radiation shielding properties for extremely long periods of time.

Figure 1:
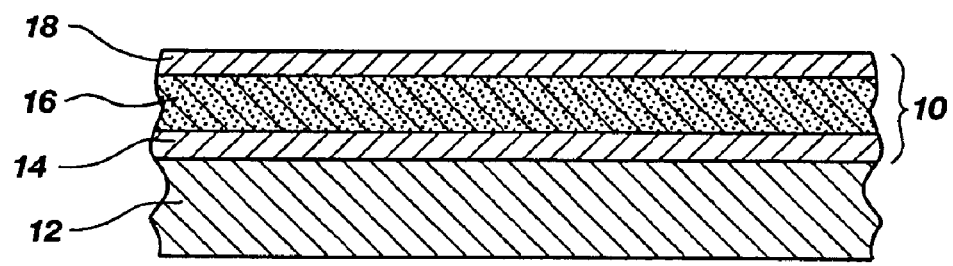
FIG. 1 is a schematic sectional view of the coating structure of a three-layer coating according to one embodiment of the invention.

The thermal neutron absorbing coating materials of the invention can be applied as a composite neutron absorbing coating to various objects such as SNF storage containers. In one embodiment of the invention, the composite neutron absorbing coating can be a three-layer coating applied to a SNF storage container. The three-layer coating includes a bond coat layer which is compatible with the base structural metal of the storage container, an intermediate neutron absorbing layer applied over the bond coat layer, and a dense, corrosion resistant top coat layer applied over the intermediate neutron absorbing layer. In another embodiment, the bond coat layer can be eliminated when the neutron absorbing layer is compatible with the base structural metal of the storage container, so that a two-layer coating is applied to the storage container. The two-layer coating includes a neutron absorbing layer applied to the storage container, and a corrosion resistant top coat layer applied over the neutron absorbing layer. Each of these coating layers will be discussed in further detail hereafter Referring now to the drawings, wherein like structures are provided with like reference designations, FIG. 1 is a schematic sectional view of the coating structure of a three-layer coating 10 applied to a substrate surface section 12. The substrate surface section 12 can be the interior surface of a SNF storage container such as a Department of Energy (DOE) standardized canister or other suitable object. For example, substrate surface section 12 can also be the surface of internal structural members within a storage container, such as tubes, blocks or squares, baskets, an array of grids, and the like. The three-layer coating 10 includes a bond coat layer 14 applied over surface section 12, and an intermediate neutron absorbing layer 16 applied over bond coat layer 14. A corrosion resistant top coat layer 18 is applied over intermediate neutron absorbing layer 16.

The bond coat layer 14 in the embodiment of FIG. 1 can be formed from various powdered metallic materials which are compatible with the base substrate metal and the subsequent coating layers. For example, several different types of nickel-based alloys, including NiCrAlY, UNS NO. 06625 and UNS NO. 86276 and the like, can be used in forming the bond coat layer. Such nickel-based alloys are advantageous since they are metallurgically compatible with typical SNF storage containers, have extreme resistance to corrosion, and have suitable workability. Other suitable materials for the bond coat layer include stainless steel powders, and Ni—Al compounds. Various combinations of the above materials can also be utilized to form the bond coat layer.

The bond coat layer 14 can be formed to have a thickness of about 50 $\mu$m to about 200 $\mu$m, and preferably about 100 to about 150 $\mu$m.

Figure 2:
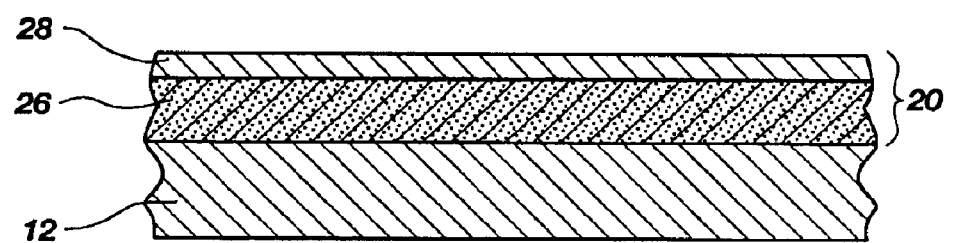
FIG. 2 is a schematic sectional view of the coating structure of a two-layer coating according to another embodiment of the invention.

FIG. 2 is a schematic sectional view of the coating structure of a two-layer coating 20 applied to a substrate surface section 12. The two-layer coating 20 includes a neutron absorbing layer 26 applied over surface section 22.

A corrosion resistant top coat layer 28 is applied over neutron absorbing layer 26.

The neutron absorbing layers 16, 26 in the three-layer and two-layer coatings of the invention contain a mixture or combination of various metallic materials that include neutron absorbing materials. Preferred neutron absorbing materials include gadolinium and compounds of gadolinium, such as gadolinium oxide ($Gd_2O_3$) and gadolinium phosphate ($GdPO_4$), as well as various mixtures thereof. Gadolinium is advantageous as a neutron absorbing material since it has the highest thermal neutron absorption cross section (48,800 barns for natural gadolinium) of any known material. For example, gadolinium has a neutron absorption ability four times as great as that of boron. Other properties of gadolinium include good malleability and ductility, which are extremely favorable characteristics for use in storage containers. Gadolinium also has a relatively low cost (about a factor of five times less expensive than boron), and is available as a metal or an oxide.

When gadolinium oxide is used as the neutron absorbing material, the gadolinium oxide can be synthesized using a conventional chemical precipitation process, or can be obtained from various commercial sources. When gadolinium phosphate is used as the neutron absorbing material, either anhydrous or hydrated crystalline phases of gadolinium phosphate ($GdPO_4 \cdot x\ H_2O$) can be employed. Anhydrous and hydrated gadolinium phosphate are insoluble in water, which makes these materials favorable in providing resistance to corrosion and long life of a coated storage container. Gadolinium phosphate does not exist in pure form in nature, but can be fabricated by chemical processes commencing with gadolinium containing chemicals. Suitable starting materials that contain gadolinium include gadolinium metal, oxides of gadolinium metal, salts of gadolinium or hydrates of the salts (e.g., $GdCl_3$, $Gd(OH)_3$, $Gd_2O_3$, $Gd_2(CO_3)_3$, $Gd(NO_3)_3$). A method for fabricating gadolinium phosphate is to dissolve the metal-salt in water and then react it by adding dilute phosphoric acid in the proper molar ratio to the solution, followed by heating in air. Heating at low temperatures (e.g., about 40° C. to about 200° C.) will usually form a hydrated compound. Continued heating to higher temperatures (e.g., about 200° C. to about 900° C.) in air will form an anhydrous crystalline metal-oxide that is stable at high temperatures.

Other suitable neutron absorbing materials that can be utilized include boron. The amount of neutron absorbing material can be varied according to different application requirements. For example, neutron absorbing material can be present in a range of about 1 to about 20 wt-%, and preferably about 5 to about 15 wt-%, based on the total weight of the material forming the neutron absorbing layer.

The other metallic materials that can be utilized in combination with the neutron absorbing material to form the neutron absorbing layer are preferably metal alloys such as nickel-based alloys. The metal alloy forms a matrix which contains the neutron absorbing material. One suitable nickel-based alloy is known as UNS NO 6022 (Alloy 22) available from Anvil, Inc. Alloy 22 contains nickel in the amount of about 56.7 wt-%; molybdenum in the amount of about 13.7 wt-%; chromium in the amount of about 21.1 wt-%; tungsten in the amount of about 3.02 wt-%; iron in the amount of about 5.15 wt-%; carbon in the amount of about 0.023 wt-%; nitrogen in the amount of about 0.091 wt-%; silicon in the amount of about 0.54 wt-%; phosphorous in the amount about 0.015 wt-%; and sulfur in the amount of about 0.008 wt-%. Alloy 22 exhibits extreme resistance to corrosion, even at elevated temperatures.

Other suitable metallic materials that can be utilized in combination with the neutron absorbing material to form the neutron absorbing layer include but are not limited to UNS NO. 06625, UNS NO. 86276, UNS NO. S30403 and UNS NO. S31603.

The neutron absorbing layers can also be composed of a composite ceramic material including individual crystals of $Gd_2O_3$ and/or $GdPO_4$ incorporated into a ceramic matrix material. In this composite ceramic material, the primary phase includes individual crystallites of either gadolinium oxide or gadolinium phosphate (non-hydrated monazite or xenotime-type structures), or both $Gd_2O_3$ and $GdPO_4$. The matrix phase is an artificial basalt (alumino-silicate) type ceramic that completely surrounds and encapsulates the gadolinium bearing crystals. Basalt is known to be extremely corrosion resistant. The basalt phase can have very fine crystals, can be glassy, or can be some combination thereof. This is dependent on the annealing treatment given to the composite after a high temperature sintering step. The basalt likely contains a limited amount of Gd incorporated as an integral part of its structure. Since the composite is sintered and thus densified at a relatively high temperature in air using liquid phase sintering, the "as-fired" material would not contain any hydrated phases.

The neutron absorbing layer can be formed to have a thickness of about 0.2 mm to about 5 mm, and preferably about 1 to about 2 mm.

One neutron absorbing composition that can be used in forming the neutron absorbing layer comprises a metal alloy material, and a plurality of neutron absorbing particles dispersed in the metal alloy material. The neutron absorbing particles are preferably gadolinium oxide, gadolinium phosphate, and mixtures thereof.

Another neutron absorbing composition useful in forming the neutron absorbing layer comprises a ceramic material, and a plurality of neutron absorbing particles dispersed in the ceramic material. The neutron absorbing particles are preferably gadolinium oxide, gadolinium phosphate, and mixtures thereof.

One preferred neutron absorbing composition comprises a metal alloy material comprising nickel, molybdenum, chromium, tungsten, and iron. A plurality of neutron absorbing particles comprising gadolinium oxide are dispersed in the metal alloy material.

The corrosion resistant top coat layers 18, 28 in the three-layer and two-layer coatings of the invention can be composed of the same metallic materials as utilized in the neutron absorbing layer, such as nickel-based alloys, which are substantially free of a neutron absorbing material. For example, the top coat layer can include Alloy 22 without the neutron absorbing material. Other suitable materials that can be utilized in the top coat layer include but are not limited to UNS NO. 06625, UNS NO. 86276, UNS NO. S30403 and UNS NO. S31603.

The top coat layer prevents the neutron absorbing material from being in contact with any corrosive material.

The thickness and material of the top coat layer can also be varied in accordance with specific application and corrosion performance requirements. The top coat layer can be formed to have a thickness of about 0.1 mm to about 4 mm, and preferably about 0.2 to about 1 mm.

In one preferred embodiment, the three-layer coating of the invention includes a bond coat layer comprising a nickel-based alloy material, a neutron absorbing layer comprising gadolinium oxide and Alloy 22, and a top coat layer comprising Alloy 22. The gadolinium oxide is present in a range of about 5 to about 15 wt-%, and preferably about 5 to about 20 wt-%, based on the total weight of the material forming the neutron absorbing layer. In an alternative embodiment, the gadolinium oxide in the neutron absorbing layer can be replaced with gadolinium phosphate at the same weight percent ranges.

In another preferred embodiment, the two-layer coating of the invention includes a neutron absorbing layer comprising gadolinium oxide and Alloy 22, and a top coat layer comprising Alloy 22. The gadolinium oxide is present in a range of about 5 to about 15 wt-%, and preferably about 5 to about 20 wt-%, based on the total weight of the material forming the neutron absorbing layer. In an alternative embodiment, the gadolinium oxide in the neutron absorbing layer can be replaced with gadolinium phosphate at the same weight percent ranges.

Figure 3:
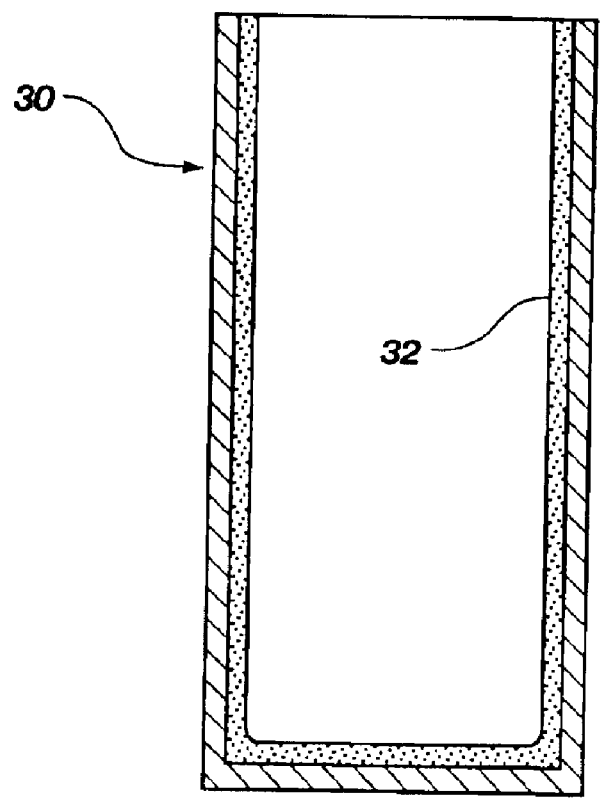
FIG. 3 is a cross-sectional schematic depiction of a storage container that has been coated on an interior surface with a composite neutron absorbing coating according to the invention.

FIG. 3 is a cross-sectional schematic depiction of a storage container 30, which has been coated on an interior surface with a composite neutron absorbing coating 32, such as the two-layer or three layer coatings of the present invention described previously. The storage container 30, such as an SNF storage container, may take the form of a transportation cask, a storage canister, or any other form which is required for a container to store radioactive thermal neutron emitting material, depending upon the specific application. The storage container 30 can be composed of stainless steel, carbon steel, nickel based alloys, or other materials known in the art.

In an alternative embodiment of the invention, the composite neutron absorbing coating 32 can be formed of a graded coating layer comprising a metal alloy material that has a gradual decrease in neutron absorbing particles toward the outer surface of the coating opposite from the substrate surface, with no specific demarcation between a neutron absorbing layer and a top coat layer. In this embodiment, neutron absorbing coating 32 can include a single graded coating layer, or can include a bond coat layer under the graded coating layer.

In a further alternative embodiment of the invention, the top coat layer can be eliminated if composite neutron absorbing coating 32 has sufficient corrosion resistance properties. In this embodiment, neutron absorbing coating 32 can include a single neutron absorbing layer, or can include a bond coat layer under a neutron absorbing layer. The neutron absorbing layer can include a metal alloy matrix, and a plurality of neutron absorbing particles dispersed in the metal alloy matrix. The neutron absorbing layer can alternatively comprise a ceramic material matrix, with a plurality of neutron absorbing particles dispersed in the ceramic material matrix. The neutron absorbing particles are preferably composed of gadolinium oxide, gadolinium phosphate, or mixtures thereof.

The composite neutron absorbing coating 32 can be applied to storage container 30 by various coating processes. For example, the layers of composite neutron absorbing coating 32 can applied to the interior surface of storage container 30 by thermal spray processes such as a plasma spray process or a high velocity oxygen fuel (HVOF) process. The plasma spray process produces strong chemical bonding which enhances the overall strength and corrosion resistance of the material. The HVOF process produces fully dense metallic coatings, which enhances corrosion resistance; however, the HVOF process is a relatively low temperature process and does not fully melt ceramic type particles. Plasma spray processes have much higher temperatures and produce coatings with relatively strong bonding for ceramic types of particles. In general, either process results in high-density, crack-free coatings that adhere well to stainless steel substrates. Both processes also provide coatings with impermeability to moisture and water vapor.

In a method of forming the composite neutron absorbing coating 32 on the interior surface of storage container 30, either a plasma spray torch or a HVOF torch can be used. For example, the neutron absorbing layer of coating 32 can be formed by using gas atomized metal alloys such as Alloy 22 in powder form, which typically has an average particle size of about 35 microns, but can be in a range from about 5 to 200 microns. The metal alloy powder is mixed with commercial grade gadolinium oxide or gadolinium phosphate prior to or during atomization, and the mixture is sprayed onto the interior surface of storage container 30. Alternatively, the metal alloy can be prealloyed with gadolinium, which is alloyed into the ingot material prior to forming the ingot into a powder for atomization. In another alternative, the metal alloy powder particles can be pre-coated with an adherent layer of gadolinium oxide or gadolinium phosphate by spray drying or using a binder material.

The top coat layer of coating 32 can also be formed by using gas atomized Alloy 22 in powder form, without any gadolinium or gadolinium compounds, which is applied onto the neutron absorbing layer. If the bond coat layer is employed, then this layer is applied to the interior surface of storage container 30 prior to the other layers. The bond coat layer can also be applied using a plasma spray torch or a HVOF torch.

The composite neutron absorbing coatings of the present invention provide many benefits and advantages. These coatings have high neutron absorbing capability and extreme resistance to corrosion. In addition, the coatings can be applied onto a wide variety of metallic substrates, such as carbon steel and stainless steel, and have mechanical robustness for very long periods of time. The coatings of the invention can be applied with conventional, readily available thermal spray coating equipment, making the coatings economical and convenient to fabricate. Further, the coatings can be easily applied over several ASME Section III, Division III Code approved structural substrates, thereby meeting all applicable Nuclear Regulatory Commission rules for containers. For example, the coatings are suitable for use in SNF applications such as storage racks, canisters, and transportation casks used in long term storage and transport of radioactive wastes. The coatings of the invention also show evidence of having a potential lifetime of over fifty thousand years.

The following examples are set forth to illustrate the present invention, and are not intended to limit the scope of the invention.

EXAMPLE 1

Composite coatings of $Gd_2O_3$/Alloy 22 according to the present invention were deposited on a Type 316L stainless steel substrate using a conventional Metco 9MB plasma spray torch and a TAFFA JP5000 HVOF torch. The HVOF torch used oxygen and kerosene as the combustion gases. An argon-hydrogen mixture was used as the process gas in the plasma spray gun. Coatings were produced by either method by sequential impact of molten or semi-molten droplets on a substrate that was prepared by grit blasting just prior to the coating application. Grit blasting cleaned the substrate and roughened the surface so that for metallic coatings there was a mechanical bond between the coating and the substrate. In general, for the plasma spray process, the particles attained a temperature of about 2000° C. and a velocity of about 100–200 m/s just prior to impacting the substrate. With HVOF, the nominal particle temperature was on the order of about 1300–1400° C., and the particle velocity was about 500–700 m/s. The metallic powders used to form the coatings were fed radially into the guns and the substrates were rastered in the particle plume at a fixed standoff distance of 100 mm for the plasma spray process and 356 mm for the HVOF process. The coatings were produced in laboratory air without any additional shielding gas.

Gas atomized Alloy 22 powder with an average particle size of 35 microns was purchased from Anvil, Inc., and was mixed with commercial $Gd_2O_3$ powder which was synthesized through a chemical precipitation process. The relative amounts of powders were determined by volume, assuming that the tap density of the two materials was the same. The powders were co-fed into the torch using conventional rotary powder feeders with argon as the carrier gas. A scanning electron micrograph showed that the Alloy 22 powder has nearly spherical particles, while the $Gd_2O_3$ powder is much finer and has an angular morphology. In general, both the plasma spray and HVOF processes resulted in high density, crack-free coatings that adhered well to the stainless steel substrates.

EXAMPLE 2

Scanning electron micrographs (SEMs) of coatings made using plasma spray and HVOF processes as described in Example 1 were examined. The SEM images were made in the backscattered electron mode so that the $Gd_2O_3$ particles appeared very bright compared to the Alloy 22 in the coating matrix. A comparison was done between the coatings made by the two processes. It was apparent that there were fewer oxide inclusions in the HVOF coating. This was consistent with the particles in HVOF deposition having a lower average temperature and having less residence time in flight because of their higher velocity. It was apparent from the micrographs that there was a relatively low volume fraction of $Gd_2O_3$ in the coatings.

The permeability of both HVOF and plasma spray coatings to moisture or water vapor was tested, and they were both found to be impermeable. The relative volume fraction of oxide inclusions in the plasma spray coatings was of some concern for long term corrosion resistance. Accordingly, experiments were performed to demonstrate the feasibility of forming a dense Alloy 22 top coat on the plasma spray composite coating using HVOF. The top coat HVOF coating was found to be fully dense, contain fewer oxide inclusions, and was well bonded to the plasma sprayed composite coating.

EXAMPLE 3

Figure 4:
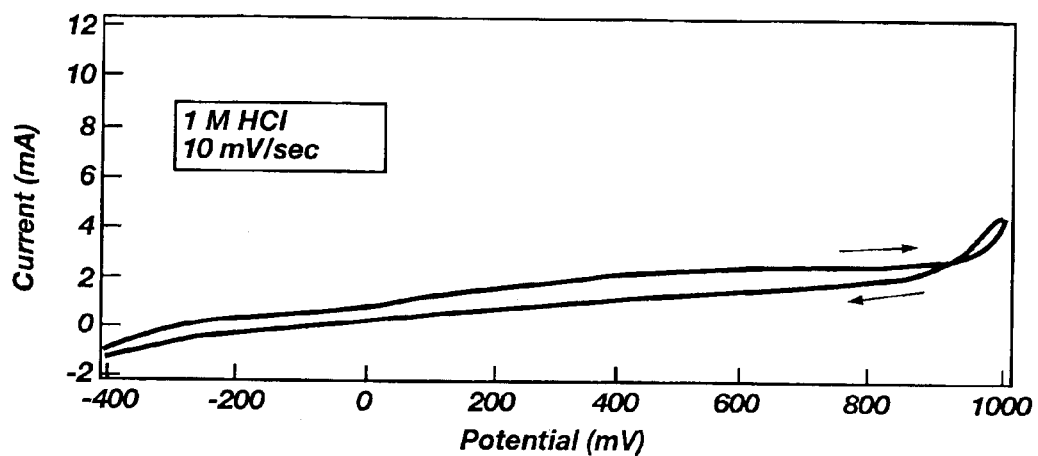
FIGS. 4–6 show graphical representations of potentiodynamic scans of coatings of the invention immersed in different corrosive solutions.
Figure 5:
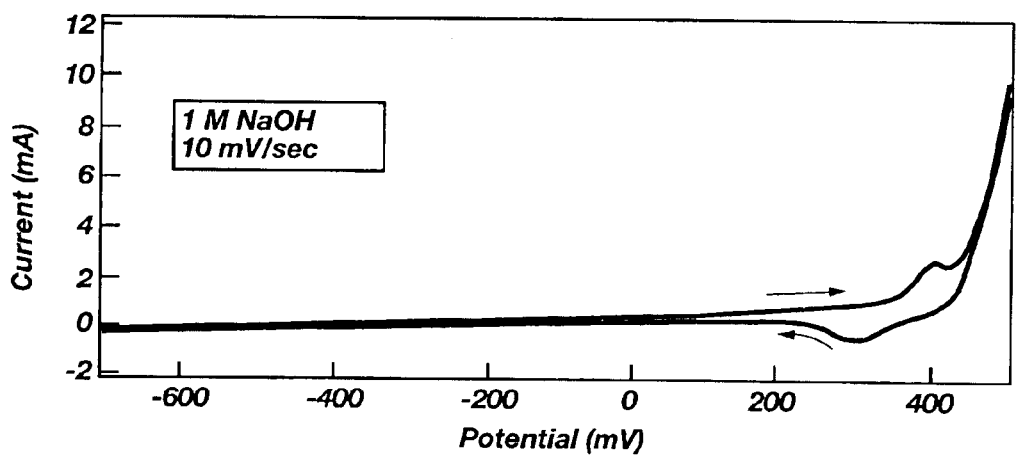
Figure 6:
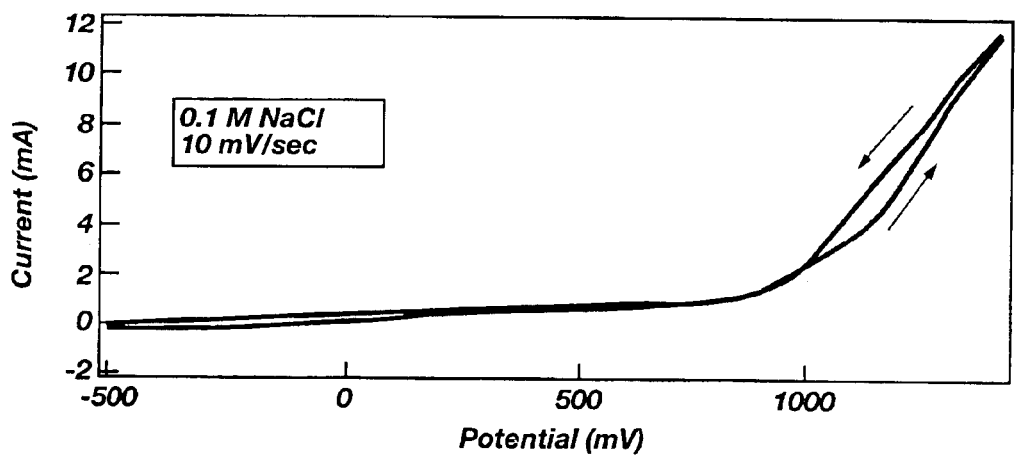

Corrosion performance characterization was carried out on several HVOF coating samples formed with Alloy 22 powder on stainless steel. Potentiodynamic scans for as-sprayed Alloy 22 coating samples immersed in three different aqueous solutions are shown in the graphs of FIGS. 4–6. FIG. 4 shows the results in a 1 M HCl solution, FIG. 5 shows the results in a 1 M NaOH solution, and FIG. 6 shows the results in a 0.1 M NaCl solution. All scans were performed at a temperature of 24° C. and at a scan rate of 10 mV/s; with a sample size of 1 $cm^2$. The plots shown in the graphs of FIGS. 4–6 indicate that the coatings behave in a similar manner as conventional nickel-based alloys. Several samples were examined using a stereo microscope subsequent to the electrochemical testing, and there was no indication of pitting corrosion.

Figure 7:
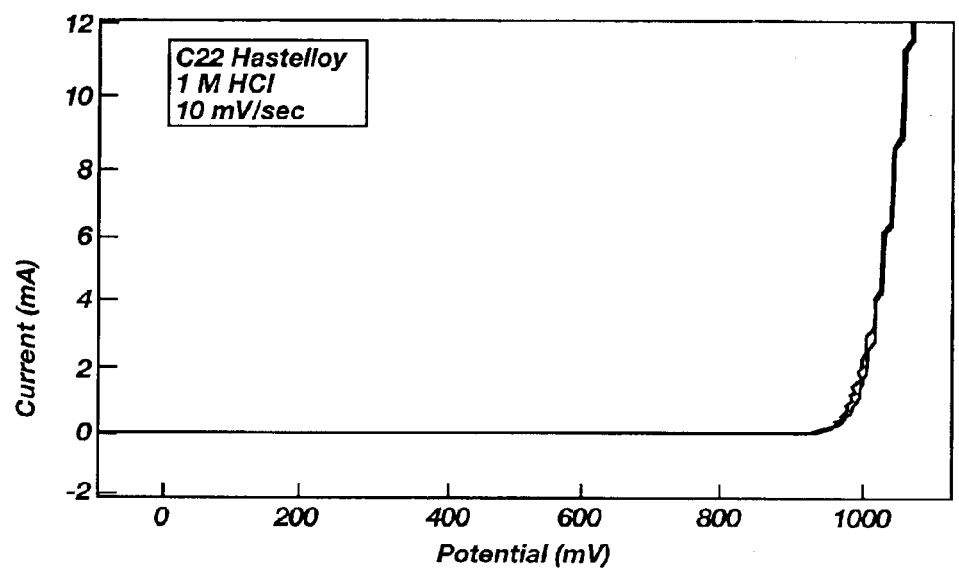
FIG. 7 is a graphical representation of potentiodynamic scans of polished samples of a conventional wrought metal alloy immersed in a corrosive solution.

FIG. 7 is a graph of potentiodynamic scans of polished samples of conventional wrought Alloy 22 immersed in a 1 M HCl solution. All scans were performed at a temperature of 24° C. and at a scan rate of 10 mV/s. A comparison of the graph of FIG. 4 with the graph of FIG. 7 indicates that the behavior of the Alloy 22 powdered coatings is similar to the wrought Alloy 22, and indicative of passivity in the test solution, with no evidence of passive film breakdown that would lead to localized corrosion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A composite neutron absorbing coating on substrate surface, the coating comprising:

a neutron absorbing layer overlying at least a portion of the substrate surface; and a corrosion resistant top coat layer overlying at least a portion of the neutron absorbing layer; and wherein the absorbing layer comprises: a nickel-based alloy; and a plurality of neutron absorbing particles dispersed in the nickel-based alloy, the neutron absorbing particles comprising a material selected from the group consisting of gadolinium, gadolinium oxide, gadolinium phosphate, and mixtures thereof; and wherein the nickel-based alloy comprises nickel, molybdenum, chromium, tungsten, and iron; and wherein the top coat layer comprises a nickel-based alloy substantially free of neutron absorbing material, and further comprises nickel, molybdenum, chromium, tungsten, and iron.

2. The coating of claim 1, wherein the neutron absorbing layer comprises a composite ceramic material including gadolinium oxide and/or gadolinium phosphate.

3. The coating of claim 1, wherein the neutron absorbing layer has a thickness of about 0.2 mm to about 5 mm.

4. The coating of claim 1, wherein the top coat layer has a thickness of about 0.1 to about 2 mm.

5. The coating of claim 1, further comprising a bond coat layer between the substrate surface and the neutron absorbing layer.

6. The coating of claim 5, wherein the bond coat layer comprises a material selected from the group consisting of nickel-based alloys, stainless steel, boron compounds and combinations thereof.

7. The coating of claim 5, wherein the bond coat layer has a thickness of about 0.1 $\mu$m to about 0.5 mm.

8. A composite neutron absorbing coating on a substrate surface, the coating comprising:

a graded coating layer overlying at least a portion of the substrate surface, the graded coating layer comprising:
a metal alloy matrix; and
a plurality of neutron absorbing particles selected from the group consisting of gadolinium, gadolinium oxide, gadolinium phosphate, and mixtures thereof disposed in the metal alloy matrix such that there is a gradual decrease in the amount of neutron absorbing particles toward an outer surface of the graded coating layer opposite from the substrate surface.

9. The coating of claim 8, further comprising a bond coat layer between the substrate surface and the graded coating layer.

10. A composite neutron absorbing coating on a substrate surface, the coating comprising:
- a bond coat layer overlying at least a portion of the substrate surface; a neutron absorbing layer overlying at least a portion of the substrate surface and at least a portion of the bond coat layer; the neutron absorbing layer comprising:
- a metal alloy matrix; and
- a plurality of neutron absorbing particles dispersed in the metal alloy matrix, the neutron absorbing particles comprising a material selected from the group consisting of gadolinium oxide, gadolinium phosphate, and mixtures thereof; and
- wherein the metal alloy matrix is a nickel-based alloy further comprising nickel, molybdenum, chromium, tungsten, and iron.

11. A composite neutron absorbing coating on a substrate surface, the coating comprising:
- a neutron absorbing layer overlying at least a portion of the substrate surface; the neutron absorbing layer comprising:
  - a ceramic material matrix comprising an alumino-silicate material; and
  - a plurality of neutron absorbing particles dispersed in the ceramic material matrix, the neutron absorbing particles including gadolinium phosphate.

12. A neutron absorbing composition, comprising:
- a ceramic material comprising an alumino-silicate material; and
- a plurality of neutron absorbing particles dispersed in the ceramic material, the neutron absorbing particles including gadolinium phosphate.

13. A thermal neutron absorbing storage system, comprising: one or more surfaces configured to be exposed to thermal neutrons from spent nuclear fuel or other radioactive waste; and
- a composite neutron absorbing coating on the one or more surfaces, the coating comprising:
- a neutron absorbing layer overlying at least a portion of the one or more surfaces; and a corrosion resistant top coat layer overlying at least a portion of the neutron absorbing layer; and
- wherein the absorbing layer comprises: a nickel-based alloy; and a plurality of neutron absorbing particles dispersed in the nickel-based alloy, the neutron absorbing particles comprising a material selected from the group consisting of gadolinium, gadolinium oxide, gadolinium phosphate, and mixtures thereof: and
- wherein the nickel-based alloy comprises nickel, molybdenum, chromium tungsten, and iron; and
- wherein the top coat layer comprises a nickel-based alloy substantially free of neutron absorbing material, and further comprises nickel molybdenum, chromium, tungsten, and iron.

14. The system of claim 13, wherein the one or more surfaces are on objects selected from one or more of the group consisting of storage containers, canisters, tubes, blocks, squares, baskets, and grid arrays.

15. The system of claim 13, wherein the neutron absorbing layer comprises a composite ceramic material including gadolinium oxide and/or gadolinium phosphate.

16. The system of claim 13, further comprising a bond coat layer between the one or more surfaces and the neutron absorbing layer.

17. The system of claim 16, wherein the bond coat layer comprises a material selected from the group consisting of nickel-based alloys, stainless steel, boron compounds, and combinations thereof.

18. A method of forming a composite neutron absorbing coating on a substrate surface, the method comprising: forming a neutron absorbing layer over at least a portion of the substrate surface; and forming a corrosion resistant top coat layer over at least a portion of the neutron absorbing layer; and
- wherein the absorbing layer comprises: a nickel-based alloy; and a plurality of neutron absorbing particles dispersed in the nickel-based alloy, the neutron absorbing particles comprising a material selected from the group consisting of gadolinium, gadolinium oxide, gadolinium phosphate, and mixtures thereof: and
- wherein the nickel-based alloy comprises nickel, molybdenum, chromium, tungsten. and iron: and
- wherein the top coat layer comprises a nickel-based alloy substantially free of neutron absorbing material, and further comprises nickel molybdenum, chromium, tungsten, and iron.

19. The method of claim 18, wherein the neutron absorbing layer and the top coat layer are formed by a thermal spray process.

20. The method of claim 19, wherein the thermal spray process is selected from the group consisting of a plasma spray process, and a high velocity oxygen fuel process.

21. The method of claim 18, further comprising forming a bond coat layer on at least a portion of the substrate surface prior to forming the neutron absorbing layer.

22. The method of claim 18, wherein the neutron absorbing layer is formed from a metal alloy material, and the neutron absorbing material comprises a plurality of neutron absorbing particles dispersed in the metal alloy material.

* * * * *